United States Patent
Bagli et al.

[15] 3,671,570
[45] June 20, 1972

[54] DERIVATIVES OF 9-OXO-15-HYDROXYPROSTANOIC ACID, HOMOLOGS THEREOF AND THEIR PREPARATION

[72] Inventors: Jehan F. Bagli, Valois Gardens; Tibor Bogri, Montreal, Quebec, both of Canada

[73] Assignee: Ayerst McKenna and Harrison Limited, Ville St. Laurent, Quebec, Canada

[22] Filed: July 30, 1970

[21] Appl. No.: 59,702

[52] U.S. Cl. .................260/468 R, 260/345.7, 260/345.8, 260/473 A, 260/514 R, 260/520, 424/305, 424/308, 424/317
[51] Int. Cl. .......................C07c 61/36, C07c 65/20
[58] Field of Search ...................260/408, 514, 473, 520

[56] References Cited

FOREIGN PATENTS OR APPLICATIONS 1,097,533  1/1968  Great Britain .................260/468
1,533,808  7/1968  France .................260/468

OTHER PUBLICATIONS

Klok et al. Rec. Trav. Chem. 82, 813 (1968)
Corey et al. TACS 91 5675 (1969)

*Primary Examiner*—Lorraine A. Weinberger
*Assistant Examiner*—Robert Gerstl
*Attorney*—Edmund H. O'Brien, Andrew Kafko, Dwight J. Potter and Joseph Marin Weigman

[57] ABSTRACT

There are disclosed herein derivatives of 9-oxo-15-hydroxy prostanoic acid, lower alkyl esters thereof, and homologs thereof, as well as a process for preparing the above acids, lower alkyl esters thereof, and homologs thereof. The compounds possess hypotensive, antihypertensive, bronchospasmolytic and gastric acid secretion inhibiting properties, as well as inhibiting the aggregation of platelets and promoting the disaggregation of aggregated platelets. Methods for their use are also disclosed.

5 Claims, No Drawings

DERIVATIVES OF 9-OXO-15-HYDROXYPROSTANOIC ACID, HOMOLOGS THEREOF AND THEIR PREPARATION

BACKGROUND OF INVENTION

This invention relates to derivatives of 9-oxo-15-hydroxyprostanoic acid, to lower alkyl esters thereof, to homologs thereof, and to intermediates used in the preparation of the above compounds, as well as to a process for preparing said intermediates and the above acids, lower alkyl esters thereof, and homologs thereof.

The compounds of this invention are structurally related to the natural prostaglandins which are more fully described in their biological activities and chemical structures in the Proceedings of the Second Nobel Symposium, Stockholm June 1966, and in the review paper by U. Axen published in Annual Reports in Medicinal Chemistry, Academic Press, p. 290, New York and London, 1968. The prostaglandins occur in nature only in very small quantities, and the processes for their extraction and purification from natural sources are laborious and inefficient. It is an object of this invention to provide compounds structurally related to the naturally occuring prostaglandins by synthetic means.

The compounds of this invention have been found to possess interesting pharmacological properties when tested in standard pharmacological tests. In particular, they have been found to possess hypotensive, antihypertensive, bronchospasmolytic, and gastric acid secretion inhibiting properties which make them useful in the treatment of conditions associated with high blood pressure, in the treatment of asthmatic conditions and in the treatment of pathological conditions associated with excessive secretion of gastric acid such as, for example peptic ulcer. In addition, the compounds of this invention inhibit the aggregation of platelets and promote the disaggregation of aggregated platelets, and are useful as agents for the prevention and treatment of thrombosis. Moreover, the compounds of this invention possess a higher degree of dissociation and of selectivity in their biological activities than the starting materials from which they are prepared.

SUMMARY OF THE INVENTION

The compounds of this invention may be represented by the formula I

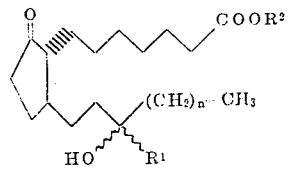

I.

in which $R^1$ is lower alkyl having from one to three carbon atoms or phenyl, $R^2$ is hydrogen or a lower alkyl group of from one to three carbon atoms, and $n$ represents an integer of from one to six. The wavy lines indicate that the steric relationship of the OH and $R^1$ groups to the rest of the molecule is not known. The process of this invention is exemplified in the flow sheet shown below, in which $R^1$, $R^2$ and n have the same significance as defined above, and $R^3$ represents hydrogen or a protective group such as an acyl group for example, the acetyl or carbobenzoyloxy group, or an ether-forming group such as, for example, the benzyl or the tetrahydropyranyl group.

The compounds of this invention may be regarded as somewhat related to compounds described and claimed in our copending application, Ser. No. 845,532, filed July 28, 1969.

The compounds of this invention may be conveniently prepared by first protecting the free hydroxyl in a compound of formulas II or III in which $R^2$ is lower alkyl and $n$ is as defined in the first instance, and instead of any one of the pure compounds of formulas II or III as starting materials a mixture of the two compounds may equally well be used. Such protection of the free hydroxyl group may be effected by acylation or etherification, preferably with an easily removable ether group such as the tetrahydropyranyl group. The resulting compounds of formulas IV or V are then treated with a Grignard reagent of the formula $R^1MgX$ in which $R^1$ is as defined in the first instance and X is a halogen with an atomic weight greater than 19. Removal of the protective group, oxidation of the resulting free hydroxyl to the corresponding ketone of the formula Ia, and optional hydrolysis of the ester-forming group $R^2$ gives the corresponding compounds of formula Ib.

Alternatively, a compound of formula VIII in which $R^2$ is a lower alkyl and $n$ is as defined in the first instance is treated with a Grignard reagent of the formula $R^1MgX$ as defined above to give the corresponding compound of formula Ia, from which the corresponding compound of formula Ib may be obtained as described above.

DETAILED DESCRIPTION OF THE INVENTION

A compound of formulas II or III in which $R^2$ is lower alkyl having one to three carbon atoms and $n$ is as defined in the first instance is treated with dihydropyran and an acid catalyst, preferably p-toluenesulfonic acid, to yield the corresponding tetrahydropyranyl ethers of formulas IV or V in which $R^3$ is the tetrahydropyranyl group and $R^2$ and $n$ are as defined above, respectively. The compounds of formula V are also obtained as intermediates in the preparation of the compounds of formula III, as described below. Said compounds of formulas IV or V are treated with a Grignard reagent of the formula $R^1MgX$ in which $R^1$ is as defined above and X is a halogen with an atomic weight greater than 19, to obtain the corresponding compounds of formulas VIa or VIIa, respectively, in which $R^3$ is the tetrahydropyranyl group, and $R^1$, $R^2$, and n are as defined above. SAid last-named compounds are treated with an acid, preferably p-toluenesulfonic acid, in solution in a lower alkanol, preferably methanol, to remove the tetrahydropyranyl group and to obtain the corresponding compounds of formulas VIb and VIIb, respectively, in which $R^3$ is hydrogen and $R^1$, $R^2$, and $n$ are as defined above. Said last-named compounds are treated with an oxidizing agent, preferably chromic anhydride in acetone solution or Jones' reagent, to obtain the corresponding keto derivative of formula Ia in which $R^1$, $R^2$ and n are as defined above, and said last-named compound is treated with a base, preferably sodium hydroxide in methanol, to yield the base, preferably sodium hydroxide in methanol, to yield the corresponding compound of formula Ib in which $R^2$ is hydrogen and $R^1$ and $n$ are as defined above.

Alternatively, a compound of formula VIII in which $R^2$ is lower alkyl having one to three carbon atoms and $n$ is as defined in the first instance is treated with a Grignard reagent of the formula $R^1MgX$ in which $R^1$ and X are as defined above, to yield the corresponding compound of formula Ia in which $R^1$, $R^2$ and n are as defined above, from which the corresponding compound of formula Ib is obtained as described above.

The following formulas will illustrate the above sequences of reactions.

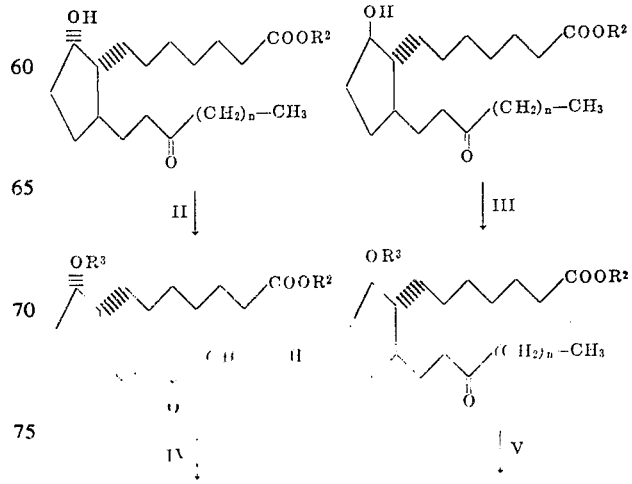

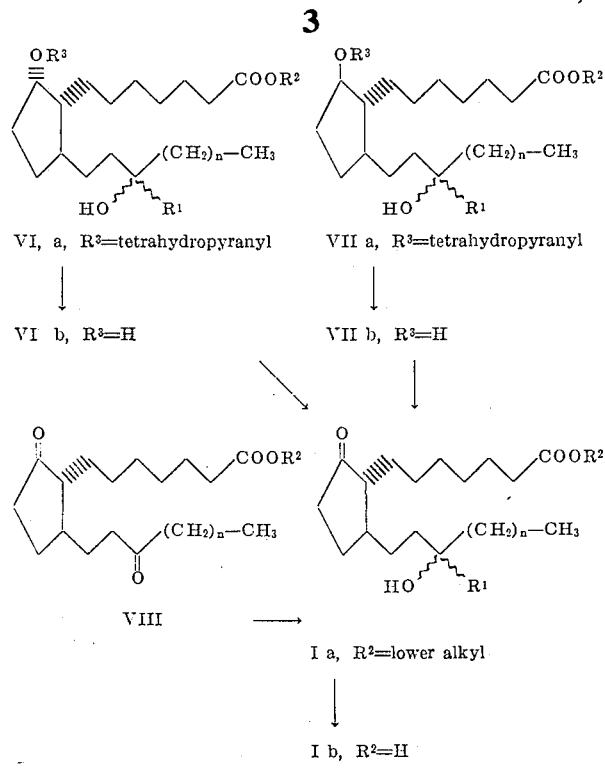

The compounds prepared by the process of this invention have been found to possess the interesting pharmacological properties enumerated above. More particularly, these compounds when tested in a modification of the tests for determining hypotensive activities described in "Screening Methods in Pharmacology," Academic Press, New York and London 1965, page 146, using the cat in urethane-chloralose anaesthesia as the test animal and measuring mean arterial blood pressure before and after intravenous administration of the compounds, have exhibited utility as hypotensive agents. When tested in the renal hypertensive rat prepared by the method of A. Grollman described in Proc. Soc. Exp. Biol. Med., Vol. 7, p. 102 (1954), and measuring blood pressure by the method described by H. Kersten in J. Lab. Clin. Med., Vol. 32, p. 1090 (1947), they have exhibited utility as antihypertensive agents.

Moreover, the compounds of this invention, when tested in a modification of the test method described by Armitage et al. in Brit. J. Pharmacol,. Vol. 16, p. 59 (1961), have been found to alleviate bronchospasms, and are useful as bronchospasmolytic agents.

Furthermore, the compounds of this invention, when administered to rats in the test method described by Shay et al. in Gastroenterology, Vol. 26, p. 906 (1954), have been found to inhibit the secretion of gastric acid, and are useful as agents inhibiting the secretion of gastric acid.

In addition, the compounds of this invention, when tested in a modification of the test method described by G.V.R. Born in Nature, Vol. 194, p. 927 (1962), using the aggregometer manufactured by Bryston Manufacturing Limited, Rexdale, Ontario, Canada, have been shown to inhibit the aggregation of platelets and to promote the disaggregation of aggregated platelets, and are useful as agents for the prevention and treatment of thrombosis.

When the compounds of this invention are employed as hypotensive or anti-hypertensive agents, as agents inhibiting gastric acid secretion in warm-blooded animals, for example, in cats or rats, as agents for the prevention or treatment of thrombosis, or as bronchospasmolytic agents, alone or in combination with pharmacologically acceptable carriers, their proportions are determined by their solubilities, by the chosen route of administration, and by standard biological practice. The compounds of this invention may be administered orally in solid form containing such excipients as starch, lactose, sucrose, certain types of clay, and flavoring and coating agents. However, they are preferably administered parenterally in the form of sterile solutions thereof which may also contain other solutes, for example, sufficient sodium chloride or glucose to make the solution isotonic. For use as bronchospasmolytic agents, the compounds of this invention are preferably administered as aerosols.

The dosages of the present hypotensive, antihypertensive, gastric acid secretion inhibiting, or bronchospasmolytic agents, or agents for the prevention and treatment of thrombosis will vary with the forms of administration and the particular hosts under treatment. Generally, treatments are initiated with small dosages substantially less than the optimum doses of the compounds. Thereafter, the dosages are increased by small increments until the optimum effects under the circumstances are reached. In general, the compounds of this invention are most desirably administered at a concentration level that will generally afford effective results without causing any harmful or deleterious side effects and preferably at a level that is in a range of from about 0.1 mg. to about 10.0 mg. per kilo, although as aforementioned variations will occur. However, a dosage level that is in range of from about 0.5 mg. to about 5 mg. per kilo is most desirably employed in order to achieve effective results. When administering the compounds of this invention as aerosols the liquid to be nebulized contains preferably from 0.005 – 0.05 per cent of the active ingredient.

The starting materials for the preparation of the compounds of this invention may be conveniently prepared as described in German Offenlegungsschrift Pat. No. 1,953,232, published Apr. 30, 1970.

Briefly, 2-(6-carboxyhexyl)-cyclopent-2-en-1-one is prepared as described in U.S. Pat. No. 3,432,541 and is esterified by treatment with p-toluenesulfonic acid and a lower alkanol of the formula $R^2OH$ in which $R^2$ is as defined in the first instance, to yield the corresponding ester of formula IX. The methyl ester is preferred, but ethyl or propyl esters may also be used. Said last-named compound of formula IX is reacted with a chlorovinyl ketone of the formula X containing from six to 11 carbon atoms. If it is desired to prepare the derivatives of 9-oxo-15-hydroxyprostanoic acid of this invention, the starting material is 1-chloro3-oxooct-1-ene, prepared according to the general procedure described in Organic Syntheses Vol. 32, p. 27 (1952). The reaction is preferably carried out in the absence of a solvent, by irradiation with a 550 W mercury vapor lamp with Pyrex filter and water cooling at 20°-40° C. for 24 to 48 hours. Evaporation under reduced pressure followed by purification, for example by chromatography, yields 7-hexanoyl-6-chloro-2-oxobicyclo[3,2,0]d-heptane-1-heptanoic acid methyl ester (XI, $R^2=CH_3$, $n=4$). The latter compound, upon treatment with approximately 20 parts of zinc and acetic acid at temperatures between 60° C. and the boiling point of the mixture for several hours, preferably overnight, yields a mixture of 7-hexanoyl-2-oxobicyclo-[3,2,0]-heptane-1-heptanoic acid methyl ester (XII, $R^2 = CH_3$, $n = 4$) and 9,15-dioxoprostanoic acid methyl ester (VIII, $R^2 = CH_3$, $n = 4$) which is separated, preferably by chromatography. Using approximately 30 parts of zinc per part of compound XI it is possible to obtain predominantly the compound of formula VIII. However, it is also possible to convert the compound of formula XII to that of formula VIII by an additional treatment with zinc and acetic acid.

In the same manner as described above, but using as the chlorovinyl ketones chlorovinyl methyl, ethyl, propyl, butyl, or hexyl ketones, and proceeding as above, there are obtained the compounds of formula XI ($R^2$=lower alkyl, and $n$=1,2,3,5 or 6), viz., 7-acetyl-, 7-propionyl-,7-butanoyl-, 7-pentanoyl-, 7-heptanoyl-, and 7-octanoyl-6-chloro-2-oxobicyclo-[3,2,0]-heptane-1-heptanoic acid lower alkyl esters, respectively. The latter compounds are converted by treatment with zinc and acetic acid in the same manner as described above to mixtures of the corresponding compounds of formula XII ($R^2$=lower alkyl, $n$=1,2,3,5, or 6) viz., 7-acetyl-, 7-propionyl-, 7-butanoyl-, 7-pentanoyl-, 7-heptanoyl-, or 7-octanoyl-2-oxobicyclo-[3,2,0]-heptane-1-heptanoic acid lower alkyl esters with the respectively corresponding compounds of formula VIII ($R^2$=lower alkyl, $n$=1,2,3,5, or 6) viz., the trans-lower alkyl esters of 2-(6-carboxyhexyl)-3-oxobutyl-, 3-oxopentyl-, 3-oxohexyl-, 3-oxoheptyl-, or 3-oxononyl-, or 3-oxodecyl-cyclopentan-1-one.

The compounds of formula VIII in which $R^2$ is as defined in the first instance, and preferably those in which $R^2$ represents a lower alkyl group, are treated with an alkali metal borohydride, in solution in a di-(lower alkoxy)-ethane at low temperatures, preferably with sodium borohydride in dimethoxyethane at a temperature within the range of from −30° to −60° C. for periods of time of from 0.5 – 1.5 hours; preferably for 1 hour to yield the corresponding compounds of formula II in which $R^2$ represents a lower alkyl group and $n$ is as defined above, and a mixture of the corresponding compounds of formulas III and XIII in which $R^2$ represents a lower alkyl group, and n is as defined above. Said mixture of compounds of formulas III and XIII is treated with an agent capable of introducing a protective group on the free hydroxyl, such as, an esterifying or etherifying agent, preferably dihydropyran in the presence of a catalyst, preferably p-toluenesulfonic acid, in solution in a halogenated hydrocarbon, preferably chloroform, to yield a mixture of the corresponding tetrahydropyranyl ethers. Separation of said-last-named mixture is carried out by physical means, preferably by chromatography, and the protective group is removed by appropriate means. In the case of the above tetrahydropyranyl ethers, the tetrahydropyranyl group is removed by treatment with an acid, preferably a sulfonic acid ion exchange resin ("-Dowex 50"), to yield the corresponding compounds of formulas III and XIII in which $R^2$ represents a lower alkyl group and n is as defined above.

More specifically, when stirring the compounds of formula VIII in which $R^2$ represents the methyl group and n is as defined in the first instance with sodium borohydride at −60° C. in solution in dimethoxyethane for 1 hour, diluting with ether, washing with saturated aqueous ammonium chloride solution and water, drying, evaporating the solvent, chromotographing on silica gel and eluting with ethyl acetate in benzene, there are obtained first the corresponding compounds of formula II, viz., the methyl esters of trans-2-(6-carboxyhexyl)-3-oxobutyl-, -3-oxopentyl-, -3-oxohexyl-, -3-oxoheptyl-, 3-oxooctyl-, -3-oxononyl-, and -3-oxodecyl-cyclopentan-1α-o1; respectively. The methyl ester of trans-2-(6-carboxyhexyl)-3-oxooctyl-cyclopentan-1α-o1 is also named 9α-hydroxy-15-oxoprostanoic acid methyl ester.

Further elution as above then yields a mixture of the corresponding methyl esters of formulas II and XIII in which $R^2$ represents the methyl group and n is as defined above. This mixture is stirred with dihydropyran and p-toluenesulfonic acid in solution in chloroform, preferably at room temperature, for periods of time of from 12–48 hours, preferably 18 hours. Filtration and removal of the solvent yields a mixture of the corresponding tetrahydropyranyl ethers. Said mixture is separated by chromatography on silica gel, and elution with ethyl acetate in benzene first yields the tetrahydropyranyl ethers of the compounds of formula III viz., the methyl esters of trans-2-(6-carboxyhexyl)-3-oxobutyl-, -3-oxopentyl-, -3-oxohexyl-, -3-oxoheptyl-, -3-oxooctyl-, 3-oxononyl-, and -3-oxodecyl-1β-tetrahydropyranyloxy-cyclopentane, respectively. The methyl ester of trans-2-(6-carboxyhexyl)-3-oxooctyl-1β-tetrahydropyranyloxy-cyclopentane is also named the tetrahydropyranyl ether of 9β-hydroxy-15-oxoprostanoic acid methyl ester.

Continued elution as above yields the corresponding tetrahydropyranyl ethers of the compounds of formula XIII, viz., the methyl esters of trans-2-(6-carboxyhexyl)-3-(3-ζtetrahydropyranyloxy butyl),-3-(3ζ-tetrahydropyranyloxypentyl)-3-(3ζtetrahydropyranyloxyhexyl)-, -3-(3ζ tetrahydropyranyloxyhaptyl)-, -3-(3ζ-tetrahydropyranyloxyoctyl)-, -3-(3ζ-tetrahydropyranyloxynonyl)- and -3-(3ζ-tetrahydropyranyloxydecyl)-cyclopentan-1-one, respectively.

The above tetrahydropyranyl ethers of the compounds of formulas III or XIII are dissolved in a lower alkanol, preferably methanol, and stirred with a sulfonic acid ion exchange resin, preferably "Dowex 50," at temperatures of from 10° – 30° C., preferably at room temperature for periods of time of 12 – 48 hours, preferably for 18 hours. Filtration, removal of the solvent, taking up in ether, washing with water, drying, and evaporating the solvent yields the corresponding compounds of formulas III and XIII in which $R^2$ represents the methyl group and n is as defined above. Thus, when treating the above tetrahydropyranyl ethers of formula III in the manner described immediately above, there are obtained the methyl esters of trans-2-(6-carboxyhexyl)-3-oxobutyl-, -3-oxopentyl-, -3-oxohexyl-, -3-oxoheptyl-, -3-oxooctyl-, -3-oxononyl-, and -3-oxodecyl-cyclopentan-1β-o1, respectively.

The following formulas will illustrate the above process of preparation of the starting materials of formulas II and III.

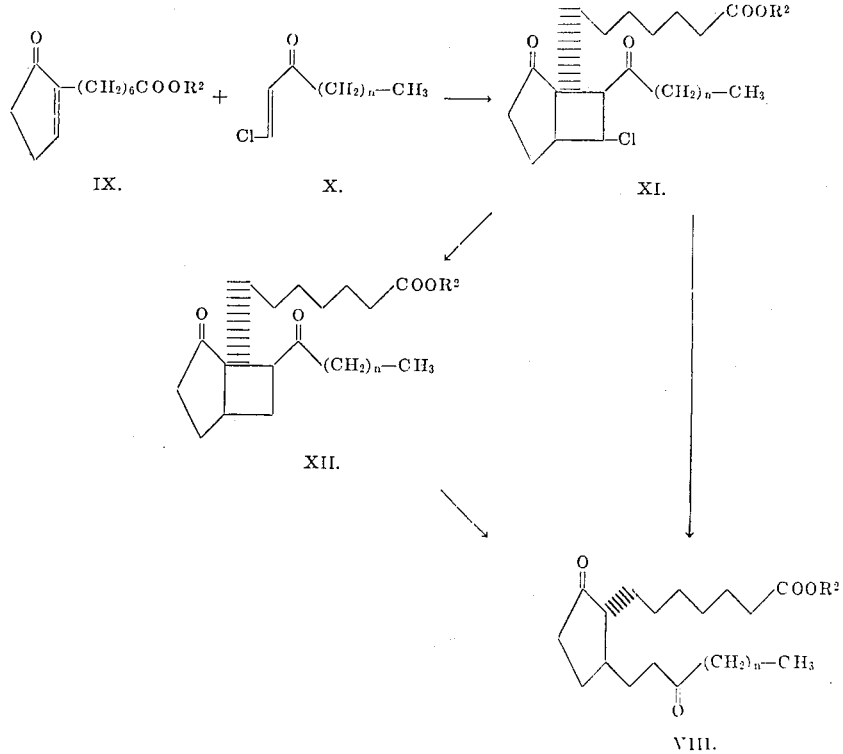

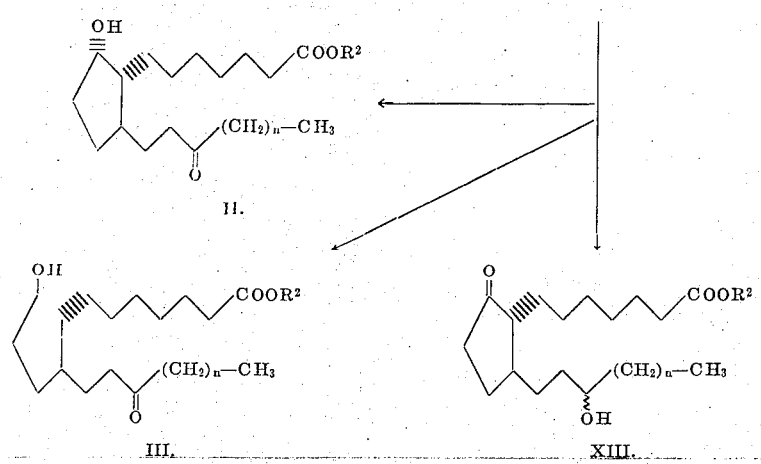

The following examples will illustrate this invention.

EXAMPLE 1

9β-Hydroxy-15-oxoprostanoic acid methyl ester (III, 1.05 g) is stirred overnight at room temperature with redistilled dihydropyran (1.2 g) in chloroform (18 ml) and p-toluenesulfonic acid (0.3 g). Neutral alunima (activity III, 3.0 g.) is added, the mixture is stirred for another 20 minutes, filtered, the solvent evaporated, and the residue chromatographed on silica gel (260 g.) from benzene containing 10 percent ethyl acetate. Elution yields the tetrahydropyranyl ether of 9β-hydroxy-15-oxoprostanoic acid methyl ester (V $R^2 = CH_3$, $R^3$ = tetrahydropyranyl, $n = 4$) as an oil with $$\gamma_{max}^{film} 1737,$$

1,720 cm$^{-1}$, NMR (CDCl$_3$) 4.65 δ (1H, doubly carbinolic), 3.82δ (1H, carbinolic 3.67δ (3H, 0-methyl) 0.91δ (terminal - CH$_3$).

In the same manner, by using 9α-hydroxy-15-oxoprostanoic acid methyl ester (II) as the starting material there is obtained the tetrahydropyranyl ether of 9α-hydroxy-15-oxoprostanoic acid methyl ester.

In the same manner, by using as starting material the methyl esters of trans-(6-carboxyhexyl)-3-oxobutyl-, -3-oxopentyl-, -3-oxohexyl-, -3-oxoheptyl-, -3-oxononyl-, or -3-oxodecyl-cyclopentan-1α- or -1βol, the corresponding tetrahydropyranyl ethers are also obtained, viz., the 1α- or 1β-tetrahydropyranyloxy derivatives of the compounds described above.

Again in the same manner, by using as starting materials the ethyl or propyl esters corresponding to the methyl esters described above as starting materials, the corresponding ethyl or propyl esters of the corresponding tetrahydropyranyl ether derivatives of the formulas IV and V are also obtained.

EXAMPLE 2

To a solution of the tetrahydropyranyl ether of 9β-hydroxy-15-oxoprostanoic acid methyl ester (V, 110 mg) in dry ether (5ml) is added commercial 2 molar solution of methyl magnesium bromide in tetrahydrofuran-benzene (0.75 ml) in five portion at room temperature with stirring over a period of 30 minutes. Aqueous ammonium chloride is added and the reaction mixture is extracted with ether. The ether extract is washed with water, dried over magnesium sulfate and the solvent evaporated. The residue (110 mg) is chromatographed on silica gel (10 g) using 10 percent ethyl acetate in benzene for elution, to yield the methyl ester of 15-hydroxy-15-methyl-9β-tetrahydropyranyloxy prostanoic acid (VIIa, $R^1 = R^2 = CH_3$, $n = 4$), an oil with $$\gamma_{max}^{film} 3460,$$

1,735 cm$^{-1}$.

In the same manner, by using as starting material the tetrahydropyranyl ether of 9α-hydroxy-15-oxoprostanoic acid methyl ester, the corresponding 15-hydroxy-15-methyl-9α-tetrahydropyranyloxy prostanoic acid methyl ester (VIa, $R^1 = R^2 = CH_3$, $n = 4$) is also obtained as an oil with $$\gamma_{max}^{film} 3460,$$

1,735 cm$^{-1}$.

Again in the same manner, but suing the ethyl or propyl esters corresponding to the above starting materials, the corresponding ethyl or propyl esters of 15-hydroxy-15-methyl-9 β- or 9α-tetrahydropyranyloxyprostanoic acid are obtained.

Again in the same manner, by using ethyl,propyl, or phenyl magnesium chloride, bromide, or iodide together with the starting materials described above, the corresponding 15-hydroxy-15-ethyl-, 15-hydroxy-15-propyl-, or 15-hydroxy-15-phenyl-9α- or 9β-tetrahydropyranyloxy prostanoic acid methyl, ethyl, or propyl esters are obtained. 15-Hydroxy-15-phenyl-9β-tetrahydropyranyloxyprostanoic acid methyl ester is obtained as an oil with $$\gamma_{max}^{film}$$

3,450, 1,737 cm$^{-1}$.

Also in the same manner, by using as starting materials the methyl, ethyl or propyl esters of trans-(6-carboxyhexyl)-3-oxobutyl-, 3-oxopentyl-, -3-oxohexyl-, -3-oxoheptyl-, -3-oxononyl-, or 3-oxodecyl-1α- or -1β-tetrahydropyranyloxycyclopentane obtained as described in Example 1, and reacting with methyl, ethyl, propyl, or phenyl magnesium chloride, bromide, or iodide, the corresponding 3-hydroxy-3-methyl, 3-hydroxy-3-ethyl, 3-hydroxy-3-propyl, and 3-hydroxy-3-phenyl derivatives with the formulas VIa and VIIa of the compounds described above are obtained.

EXAMPLE 3

To a solution of 15-hydroxy-15-methyl-9β-tetrahydropyranyl-oxyprostanoic acid methyl ester (VIIa, $R^1 = R^2 = CH_3$, $n = 4$, 63 mg) in methanol (1 ml) is added p-toluenesulfonic acid (10 mg) and the mixture is stirred at room temperature for 30 minutes. The solution is diluted with ether, washed with water, dried, and evaporated to obtain 9α, 15-dihydroxy-15-methylprostanoic acid methyl ester (VIIIb), an oil with $$\gamma_{max}^{film} 3420,$$

1,730 cm$^{-1}$.

In the same manner, by using as staring material 15-hydroxy-15-phenyl-9α-tetrahydropyranyloxyprostanoic acid methyl ester (250 mg), stirring as above with two successive portions of p-toluenesulfonic acid of 20 mg each, working up as above, and purifying by chromatography there is obtained 9β,15-dihydroxy-15-phenylprostanoic acid methyl ester (VIIIa, $R^1$ = phenyl, $R^2 = CH_3$, $n = 4$), an oil with $$\gamma_{max}^{film} 3450,$$

1,740, 1,725, 1,600 cm$^{-1}$.

Again in the same manner, by using as starting material 15-hydroxy-15-methyl-, 15-hydroxy-15-ethyl-, 15-hydroxy-15-propyl or 15-hydroxy-15-phenyl-9α- or 9β-tetrahydropyranyloxyprostanoic acid methyl, ethyl, or propyl esters obtained as described in Example 2, or the methyl, ethyl or propyl esters of trans-(6-carboxyhexyl)-3-hydroxy-3-methyl-, -3-ethyl-, -3-propyl-, or -3-phenyl-butyl-, -pentyl-, -hexyl-, -heptyl-, -nonyl-, or -decyl-1α- or -1β-tetrahydropyranyloxycyclopentane, also obtained as described in Example 2, the corresponding -1α- or -1β-hydroxycyclopentane derivatives of formulas VI$b$ and VII$b$ are also obtained, respectively. 9α,15-Dihydroxy-15-methylprostanoic acid methyl ester is obtained as an oil with $$\gamma_{max}^{film} 3420,$$

1,730 cm$^{-1}$.

EXAMPLE 4 a. Jones' reagent (30 microliters) is added portionwise to a stirred solution of 9β,15-dihydroxy-15-methylprostanoic acid methyl ester (VII$b$, R$^1$ = R$^2$ = CH$_3$, $n$ = 4, 53 mg) in acetone (1 ml) at room temperature over 30 minutes. The reaction mixture is diluted with water, extracted with ether, the ether washed with water, dried over magnesium sulfate and evaporated to yield 15-hydroxy-15-methyl-9-oxoprostanoic acid methyl ester (I$a$, R$^1$ = R$^2$ = CH$_3$, $n$ = 4), an oil with $$\gamma_{max}^{film} 3500,$$

1,785 cm$^{-1}$ and with a mass spectrum M−18, m/e 350; M−(18+31), m/e 319; M−143, m/e 225; M−(143+18), m/e 207.

b. To a solution of 9,15-dioxoprostanoic acid methyl ester (VIII, R$^2$ = CH$_3$, $n$ = 4, 2.0 g) in ether (20 ml), methylmagnesium bromide solution (2 molar in tetrahydrofuran-benzene, 11 ml) is added in 1 milliliter portions at room temperature over a period of one hour. Ammonium chloride is added, the organic layer separated, washed with water, dried over magnesium sulfate, and evaporated. The residue is chromatographed on 200 g silica gel and eluted with 10 percent ethyl acetate in benzene to yield 15-hydroxy-15-methyl-9-oxoprostanoic acid methyl ester identical with the compound obtained as described above.

In the same manner, by using as starting material 93 mg of 9α,15-dihydroxy-15-phenylprostanoic acid methyl ester obtained as described in Example 3, stirring with Jones' reagent (80 microliters) as above for ten minutes, and working up as above, there is obtained 15-hydroxy-15-phenyl-9-oxoprostanoic acid methyl ester (I$a$, R$^1$ = phenyl, R$^2$ = CH$_3$, $n$ = 4), an oil with $$\gamma_{max}^{film} 3500,$$

1,740, 1,660 cm$^{-1}$, and NMR spectrum δ 0.82 (3H,CH$_3$); 3.67 (3H,OCH$_{3b}$); 7.53 (5H,aromatic).

Again in the same manner, by using as starting materials the 9α,15-hydroxy-15-methyl- or -15-phenylprostanoic acid, or 9α,15- or 9β,15-dihydroxy-15-ethyl- or 15-propylprostanoic acid methyl, ethyl, or propyl esters obtained as described in Example 3, or the methyl, ethyl, or propyl esters of trans-(6-carboxyhexyl)-3-hydroxy-3-methyl-, 3-ethyl-, -3-propyl-, or -3-phenyl-butyl-, -pentyl-, -hexyl-, -heptyl-, -octyl-, -nonyl-, or -decyl- 1α- or-1β-hydroxy-cyclopentane, the corresponding cyclopentan-1-one derivatives of formula I$a$ are respectively obtained.

EXAMPLE 5

To a solution of 15-hydroxy-15-methyl-9-oxoprostanoic acid methyl ester (I$a$, R$^1$ = R$^2$ = CH$_3$, $n$ = 4, 260 mg) obtained as described in Example 4, in methanol (4 ml) is added a solution of 10 percent sodium hydroxide (1.1 ml) and the mixture is stirred at room temperature overnight. The solvent is removed, the residue acidified with 10% hydrochloric acid, and extracted with either. The ether layer is washed, dried, and the solvent evaporated to yield 15-hydroxy-15-methyl-9-oxoprostanoic acid (I$b$, R$^1$ = CH$_3$, R$^2$ = H, $n$ = 4), an oil with $$\gamma_{max}^{film} 3425,$$

1,730, 1,700 cm$^{-1}$.

In the same manner by using as starting material 15-hydroxy-15-phenyl-9-oxoprostanoic acid methyl ester (I$a$, R$^1$ = phenyl, R$^2$ = CH$_3$, $n$ = 4), obtained as described in Example 2, there is obtained 15-hydroxy-15-phenyl-9-oxoprostanoic acid (I$b$, R$^1$ = phenyl, R$^2$ = H, $n$ = 4), an oil with $$\gamma_{max}^{film} 3450,$$

1,700, 1,728, 1,600 cm$^{-1}$.

Again in the same manner, by using as starting materials the ethyl or propyl esters of the starting materials described above in this example, or the methyl, ethyl, or propyl esters of their 15-ethyl or 15-propyl analogs, or of trans-(6-carboxyhexyl)-3-hydroxy-3-methyl-, -3-ethyl-, -3-propyl-, or -3-phenyl-butyl-, -pentyl-, -hexyl-, -heptyl-, octyl-, -nonyl-, or -decylcyclopentan-1-one described in Example 4, there are obtained trans-(6-carboxyhexyl)-3-hydroxy-3-methyl-, -3-ethyl-, -3-propyl-, or -3-phenyl-butyl-, -pentyl-, -hexyl-, -heptyl-, octyl-, -nonyl-, or -decylcyclopentan-1-one of formula I$b$, respectively.

We claim:

1. A compound selected from those of the formula

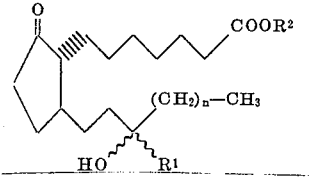

wherein R$^1$ is selected from the group consisting of lower alkyl containing from one to three carbon atoms and phenyl, R$^2$ is selected from the group which consists of hydrogen and lower alkyl containing from one to three carbon atoms and $n$ represents an integer from one to six.

2. 15-Hydroxy-15-methyl-9-oxoprostanoic acid, as claimed in claim 1.

3. 15-Hydroxy-15-phenyl-9-oxoprostanoic acid, as claimed in claim 1.

4. 15-Hydroxy-15-methyl-9-oxoprostanoic acid methyl ester, as claimed in claim 1.

5. 15-Hydroxy-15-phenyl-9-oxoprostanoic acid methyl ester, as claimed in claim 1.

* * * * *